(12) United States Patent
Tsuzura et al.

(10) Patent No.: US 6,337,452 B1
(45) Date of Patent: Jan. 8, 2002

(54) GAS INSULATED SWITCHGEAR WITH FLANGE-SPACER ASSEMBLY

(75) Inventors: Keiichi Tsuzura; Kazuhiko Takahashi; Junzo Kida, all of Hitachi; Minoru Yabuki, Naka-gun, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/776,898

(22) Filed: Feb. 6, 2001

Related U.S. Application Data

(63) Continuation of application No. 09/366,323, filed on Aug. 2, 1999, now Pat. No. 6,188,034.

(30) Foreign Application Priority Data

Aug. 3, 1998 (JP) ............................................. 10-218789

(51) Int. Cl.[7] .......................... H02B 5/00; H02B 13/02; H01H 33/02
(52) U.S. Cl. .......................... 218/43; 218/68; 218/155; 361/601; 361/618
(58) Field of Search .............................. 218/43–84, 155; 174/50.5–50.64; 361/601–603, 604–621

(56) References Cited

U.S. PATENT DOCUMENTS

| | | | | |
|---|---|---|---|---|
| 3,959,577 A | * | 5/1976 | Frink | 218/68 X |
| 4,016,382 A | * | 4/1977 | Roth | 218/43 |
| 5,142,440 A | * | 8/1992 | Lorenz et al. | 361/618 |
| 5,670,767 A | * | 9/1997 | Kobayashi et al. | 218/43 |
| 6,188,034 B1 | * | 2/2001 | Tsuzura et al. | 218/43 |

FOREIGN PATENT DOCUMENTS

| | | | |
|---|---|---|---|
| JP | 59-183129 | * | 12/1984 |
| JP | 62-98420 | * | 6/1987 |
| JP | 63-74011 | * | 5/1988 |
| JP | 64-77411 | * | 3/1989 |
| JP | 10-75513 | * | 12/1998 |

* cited by examiner

*Primary Examiner*—J. R. Scott
(74) *Attorney, Agent, or Firm*—Mattingly, Stanger & Malur, P.C.

(57) ABSTRACT

A gas insulated switchgear includes a bus unit, a breaker unit and a line side unit. An insulating spacer structure attaching at least two of the units together includes an inner flange on a first unit, an outer flange on a second unit, and an insulating spacer positioned between the first and second units. Closed end tapped holes are formed in the inner flange and idle holes are formed in the outer flange, and tapped holes with a larger diameter than that of the tapped holes of the inner flange are formed in the insulating spacer.

6 Claims, 6 Drawing Sheets

GAS INSULATED SWITCHGEAR WITH FLANGE-SPACER ASSEMBLY

This is a continuation application of U.S. Ser. No. 09/366,323, filed Aug. 2, 1999, now U.S. Pat. No. 6,188,034.

BACKGROUND OF THE INVENTION

The present invention relates to a gas insulated switchgear suited to a dismantling operation of a unit. A gas insulated switchgear is superior in size reduction, insulation performance, and safety and widely used in electric plants such as substations. A gas insulated switchgear includes a combination of a plurality of components such as a breaker, disconnecting switches, grounding switches, a potential transformer, and others and a power supply conductor for electrically connecting these devices to each other in a closed enclosure charged with insulating gas. For example, the gas insulating switchgear described in Japanese Patent Application Laid-Open 10-75513 includes a combination of line side units having a bus unit having a bus conductor, breaker unit having a breaker, arrester, potential transformer, and others.

The aforementioned units are connected via insulating spacers so as to keep air-tightness between the units. For that purpose, a flange is formed in each unit so as to connect each insulating spacer. For example, in the gas insulating switchgear described in Japanese Patent Application Laid-Open 10-75513, the flange in each unit is formed as an outer flange and when dismantling the units, in the state that the insulating spacer is attached to the flange of one unit, the other unit is separated. In addition to this gas insulating switchgear in which the flange of each unit is formed as an outer flange, there are ones described in Japanese Utility Model Application Laid-Open 62-98420 and Japanese Utility Model Application Laid-Open 63-74011. Particularly in the gas insulating switchgears described in Japanese Patent Application Laid-Open 64-77411 and Japanese Utility Model Application Laid-Open 59-183129, the flange of one unit is formed as an outer flange and the flange of the other unit is formed as an inner flange.

SUMMARY OF THE INVENTION

In a conventional gas insulating switchgear in which the flange of each unit is formed as an outer flange, the mechanical strength is relatively weak and there are many parts to be used. In a conventional gas insulating switchgear in which the flange of one unit is formed as an outer flange and the flange of the other unit is formed as an inner flange, when dismantling the units, the insulating spacer can be attached only to either one of the outer or inner flanges.

The present invention is planned in view of the above situations and an object thereof is to provide a gas insulated switchgear for dismantling units in the state that an insulating spacer can be attached to the both flanges of the units even if an inner flange is used. Another object of the present invention is to improve the dismantling operability of a gas insulated switchgear in which the flange of one unit is formed as an outer flange and the flange of the other unit is formed as an inner flange.

The gas insulated switchgear of the first present invention includes a unit having an inner flange, a unit having an outer flange, and insulating spacers existing between the flanges of the units, wherein a closed-end tapped hole is formed in the inner flange, and an idle hole is formed in the outer flange, and a tapped hole with a larger diameter than that of the hole in the inner flange is formed in each insulating spacer.

The gas insulated switchgear of the second present invention includes a unit having an inner flange, a unit having an outer flange, and insulating spacers existing between the flanges of the units, wherein when separating the inner flange side in the state that the insulating spacer is attached to the outer flange side, a bolt is screwed into a tapped hole made in the insulating spacer so as to connect the outer flange to the insulating spacer and when separating the outer flange side in the state that the insulating spacer is attached to the inner flange side, a bolt is screwed into a tapped hole made in the inner flange so as to connect the inner flange to the insulating spacer.

The gas insulated switchgear of the third present invention includes a unit having an inner flange, a unit having an outer flange, and insulating spacers existing between the flanges of the units, wherein a plurality of first holes with a diameter of D1 are formed in the periphery of the outer flange, and a plurality of second holes with a diameter of D2 are formed in the periphery of each insulating spacer, and a plurality of third holes with a diameter of D3 are formed in the periphery of the inner flange, and the relationship between the diameters of the holes is set to $D1 \geq D2 \geq D3$.

In the gas insulated switchgear of the present invention, in the state that the insulating spacer is attached to the flange of one unit, the other unit can be separated or in the state that the insulating spacer is attached to the flange of the other unit, one unit can be separated, so that the maintenance and inspection operation or the trouble recovery operation can be performed for a unit not to be maintained and inspected or a unit free from a trouble unless it is exposed to the air. As a result, the space for gas collection, evacuation, and gas charging can be made smaller, so that the unit dismantling time can be shortened. Furthermore, the space that there is a possibility of mixing of foreign substances causing dielectric breakdown can be made smaller, so that the reliability of the gas insulated switchgear can be improved.

In the connection structure that insulating spacers exist between outer flanges of two units, a large space is required, and moreover the mechanical strength is relatively weak, and it takes a lot of time to attach and remove stud bolts, and there are many parts used. However, in the gas insulated switchgear of the present invention, the outer diameter can be made smaller and the mechanical strength can be ensured. Furthermore, there is no need to use stud bolts, and as a result, the operability can be improved and the number of parts can be reduced.

DESCRIPTION OF PREFERRED EMBODIMENT

Figure 1:
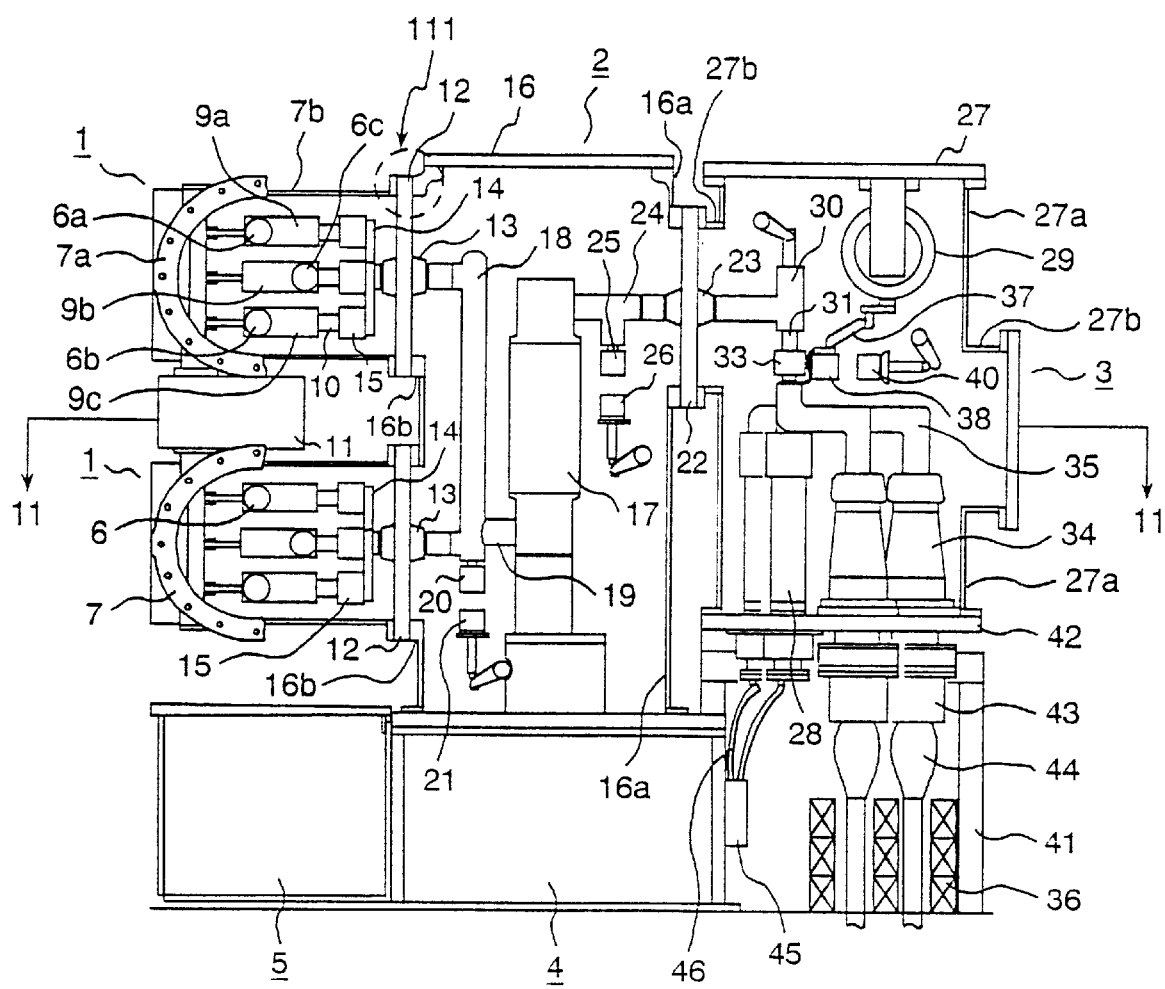
FIG. 1 is a cross sectional view showing the structure of a gas insulated switchgear of an embodiment of the present invention.
Figure 2:
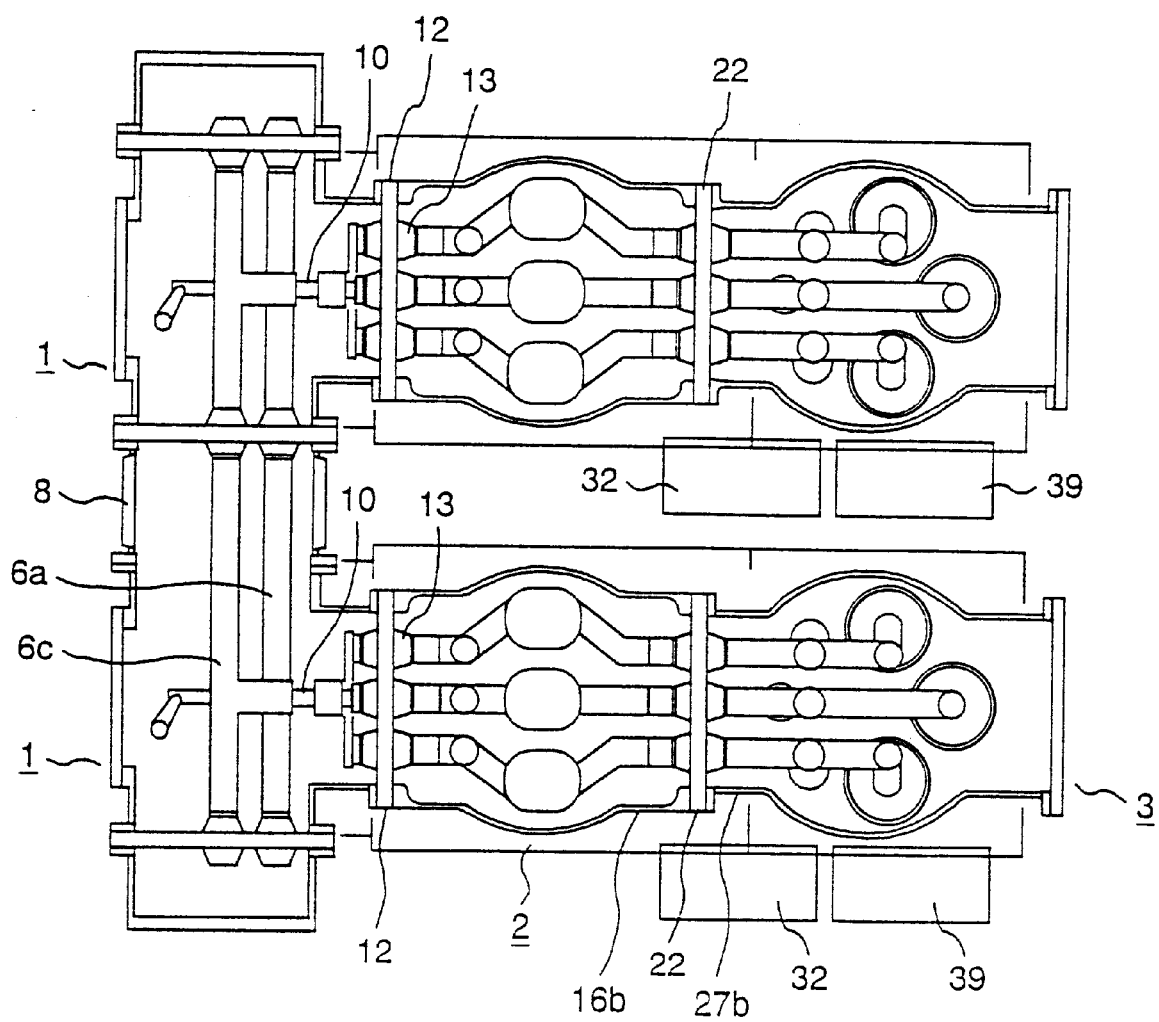
FIG. 2 is a cross sectional view taken along line 11—11 shown in FIG. 1.

The structure of a gas insulated switchgear of an embodiment of the present invention is shown in FIGS. 1 and 2. The gas insulated switchgear of this embodiment has a bus unit 1, a breaker unit 2, and a line side unit 3, and assuming the breaker unit 2 as a vertical axis, two bus units 1 are connected up and down in line with each other on one side of the axis, and the line side unit 3 is attached on the other side. An operating device 4 is arranged below the breaker unit 2. A control box 5 is arranged on the side of the operating device 4 on the bus unit 1 side.

The bus unit 1 houses bus conductors 6 for three phases in a batch in a bus enclosure 7 charged with insulating gas. The bus enclosure 7 is a grounded metal enclosure, which is formed by combining a cylindrical enclosure 7a extended in the extending direction to the bus conductors 6 and a cylindrical enclosure 7b extended in the orthogonal direction to the cylindrical enclosure 7a. The bus conductors 6 are arranged so that the three conductors are located at the vertexes of an isosceles triangle respectively and it comprises bus conductors 6a and 6b arranged in a column on the center line of the cylindrical enclosure 7a and a bus conductor 6c arranged on the breaker unit 2 side of the bus conductors 6a and 6b of the cylindrical enclosure 7a. A flange is provided at both ends of the cylindrical enclosure 7a respectively and an expansion joint 8 comprising an expansion bellows is attached to the flange at one end.

A branch conductor 9a branches from the bus conductor 6a, a branch conductor 9b from the bus conductor 6b, and a branch conductor 9c from the bus conductor 6c on the breaker unit 2 side. The branch conductors 9a, 9b, and 9c are arranged in a column on the center line of the cylindrical enclosure 7b and a movable electrode 10 is provided at each center part of the branch conductors. The movable electrodes 10 are driven by operating devices 11 provided in the space between the upper bus enclosure 7 and the lower bus enclosure 7 and make a reciprocating motion in each conductor.

Each of the bus units is attached to the breaker unit 2 via an insulating spacer 12. The insulating spacers 12 are used to keep air-tightness between each of the bus units 1 and the breaker unit 2. On the center line of the insulating spacers 12, conductor connections 13 to one end of which a reciprocating conductor 18 in the breaker unit 2 is attached are horizontally arranged in a line. On the other end of each of the conductor connections 13, a fixed electrode 15 is provided via a conductor 14. Each of the fixed electrodes 15 forms a counterpart to each of the movable electrodes 10 so as to form a disconnecting switch and it is arranged opposite to each of the movable electrodes 10 so as to freely connect and disconnect to them.

The breaker unit 2 houses breakers 17 for three phases in a batch in a breaker enclosure 16. The breaker enclosure 16 is formed by combining a cylindrical enclosure 16a extended in the perpendicular direction, a cylindrical enclosure 16b extended on the side of the bus unit 1 and the line side unit 3 above the cylindrical enclosure 16a, and a cylindrical enclosure 16b extended on the side of the bus unit under the cylindrical enclosure 16a. On the center line of the cylindrical enclosure 16a, the breakers 17 are arranged in a line in the same direction as the extending direction to the bus conductors 6.

The conductor connection 13 provided in the upper insulating spacer 12 and the conductor connection 13 provided in the lower insulating spacer 12 are connected by the reciprocating conductor 18. To the lower part of the reciprocating conductor 18, a conductor 19 connected to the lower part of the breaking section of the breaker 17 is attached. At the bottom of the reciprocating conductor 18, a fixed electrode 20 is provided. The fixed electrode 20 forms a grounding device by forming a counterpart to a movable electrode 21 driven by an operation unit (not shown in the drawing) provided outside the enclosure of the breaker unit 2 and it is arranged opposite to the movable electrode 21 so as to freely connect and disconnect to them.

The breaker unit 2 and the line side unit 3 are connected to each other via an insulating spacer 22. The insulating spacer 22 is used to keep air-tightness between the breaker unit 2 and the line side unit 3. On the center line of the insulating spacer 22, a conductor connection 23 to one end of which a conductor 30 in the line side unit 3 is attached is horizontally arranged in a line. At the other end of the conductor connection 23, a connection conductor 24 connected to the upper part of the breaker 17 is attached. The connection conductor 24 has a branch section branching on the breaking section side and at its end, a fixed electrode 25 is provided. The fixed electrode 25 forms a grounding device by forming a counterpart to a movable electrode 26 driven by an operation unit (not shown in the drawing) provided outside the enclosure of the breaker unit 2 and it is arranged opposite to the movable electrode 26 so as to freely connect and disconnect to them.

The breaker positioned at the center of the breakers 17 is arranged on a straight line connecting the one positioned at the center of the conductor connections 13 provided in the insulating spacers 12 and the one positioned at the center of the conductor connections 23 provided in the insulating spacers 22. The breakers positioned on both sides of the breaker positioned at the center of the breakers 17 are arranged outside the straight line connecting the respective corresponding conductor connections 13 and 23 so as to ensure the insulation distance. Therefore, the conductors positioned on both sides of the conductor positioned at the center of the conductors 19 extend outside the reciprocating conductor 18 and they are connected to the breakers 17. The breakers 17 are formed cylindrically. However, in this case, each surface in the arrangement direction is made flat so as to reduce the size in the arrangement direction.

The line side unit 3 houses line side devices such as an arrester 28 and a potential transformer 29 in a line side enclosure 27. The line side enclosure 27 is formed by combining a cylindrical enclosure 27a extended in the perpendicular direction, a cylindrical enclosure 27b extended on the side of the breaker unit 2 above the cylindrical enclosure 27a, and a cylindrical enclosure 27b extended on the opposite side of the breaker unit 2 almost at the center of the cylindrical enclosure 27a.

At the center of a conductor 30 connected to the conductor connection 23, a movable electrode 31 is provided. The movable electrode 31 is driven by an operating device 32 provided outside the enclosure of the line side unit 3 and makes the reciprocating motion vertically in the conductor 30. In the area opposite to the movable electrode 31, a fixed electrode 33 is provided. The movable electrode 31 and the fixed electrode 33 form a disconnecting switch by making a pair.

On the lower part in the cylindrical enclosure 27a, cable heads 34 for three phases are arranged so as to locate at the vertexes of an isosceles triangle respectively. To the cable heads 34, one end of a conductor 35 is attached. To the other end of the conductor 35, the fixed electrode 31 is attached. On the side of the cable heads 34 on the side of the breaker unit 2, the arresters 28 for three phases are arranged so as to locate at the vertexes of an isosceles triangle respectively. The arresters 28 are also connected to the conductor 35.

The arresters 28 and the cable heads 34 are arranged so that the bases of the isosceles triangles formed by them respectively are opposite to each other. Furthermore, they are arranged so that the vertexes of the isosceles triangles are located almost on a concentric circle of the cylindrical enclosure 27a. By realizing this arrangement, the efficiency of the mounting operation of a current transformer 36 at the time of installation at site can be improved. By realizing this arrangement, the outer diameter of the cylindrical enclosure 27a of the line side unit 3 can be made smaller. Furthermore, by realizing this arrangement, the cable heads 34 and the arresters 28 at least for two phases, moreover for the same phase can be arranged close to each other, so that the charging rate of the arresters 28 can be reduced and the life of the arresters 28 can be lengthened.

The disconnecting switches comprising a pair of the movable electrode 31 and the fixed electrode 33 are arranged in a line in the same direction as the arrangement direction to the breakers 17 at almost the same position as that of the ones for two phases at a long distance from the breaking unit 2 among the arresters 28. The potential transformer 29 is arranged above the cable heads 34. The potential transformer 29 can be attached to or disconnected from the conductor 35 via a separation device 37. In the conductor 35, a fixed electrode 38 different from the fixed electrode 33 is provided. The fixed electrode 38 forms a grounding device by forming a counterpart to a movable electrode 40 driven by an operation unit 39 provided outside the enclosure of the line side unit 3 and it is arranged opposite to the movable electrode 40 so as to freely connect and disconnect to them.

Under the line side unit 3, a frame 41 for mounting the line side unit 3 is provided. At the bottom of the enclosure of the line side unit 3, a base plate 42 is provided and connections 43 of the cable heads 34 are pulled out outside the enclosure of the line side unit 3 via the seal portion of this base plate 42. Cables 44 are connected to the connections 43. The current transformers 36 are attached to the cables 44.

On the side of the box for housing the breaker operating device 4 under the line side unit 3, a monitoring device 45 is attached. To the monitoring device 45, grounding cables 46 pulled out outside the enclosure of the line side unit 3 from the bottom of each arrester 28 are connected. When the grounding cables 46 are pulled out from the bottoms of the arresters 28 like this, the grounding cables can be shortened, so that the potential superimposed on the operating potential of the arresters 28 is made smaller and the arresters 28 can be precisely operated at the operating potential.

Figure 3:
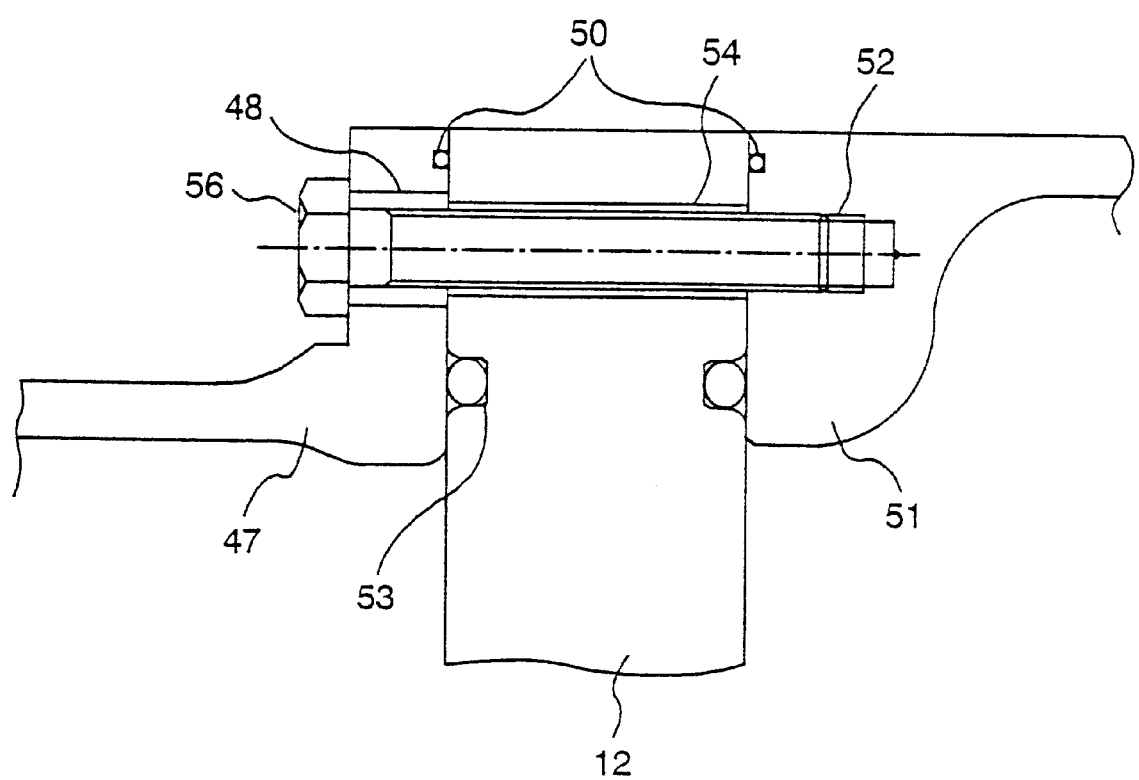
FIG. 3 is an enlarged cross sectional view showing an enlarged structure of the circular portion 111 shown in FIG. 1.
Figure 6:
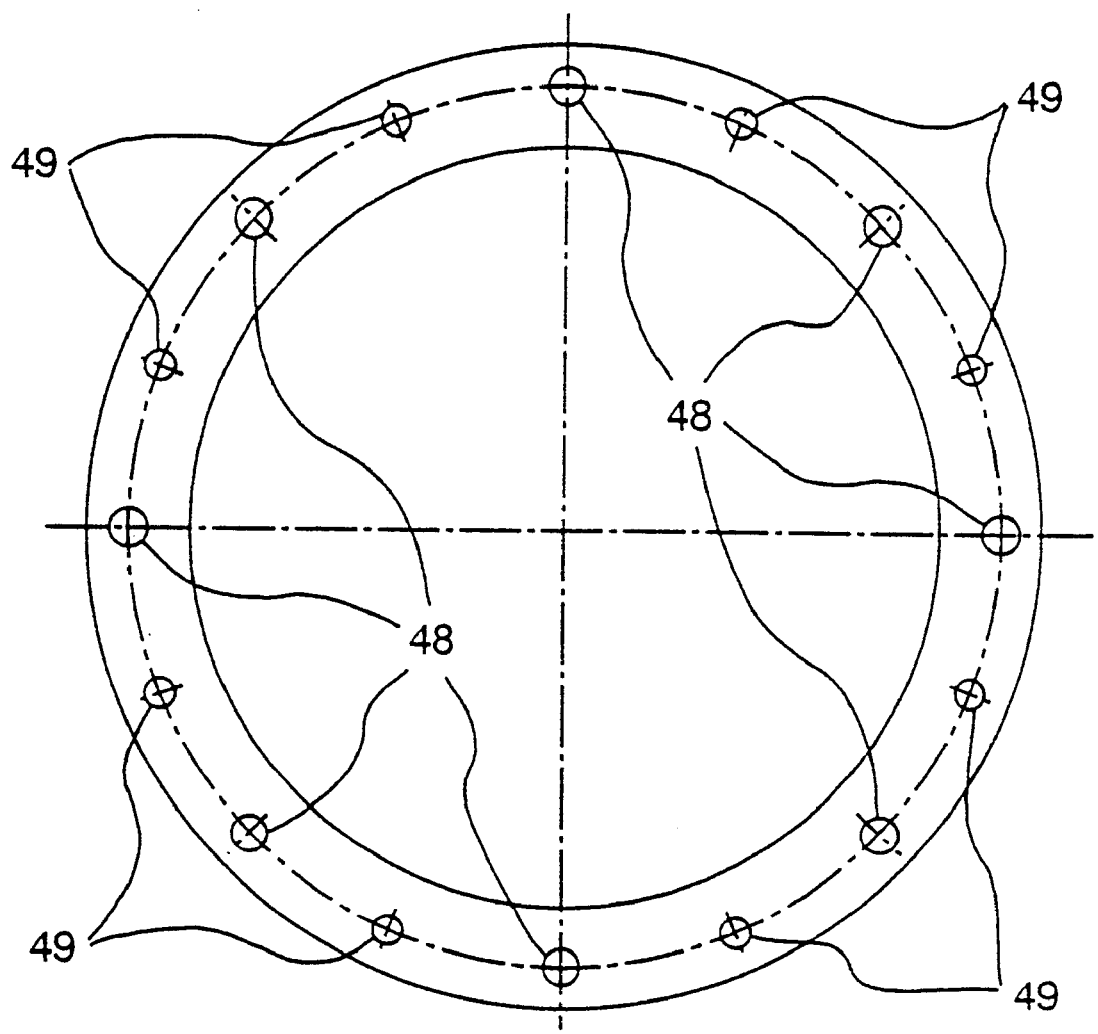
FIG. 6 is a plan view showing the arrangement structure of holes of an outer flange of an embodiment of the present invention.

The connection structure between the units is shown in FIG. 3. In this embodiment, an example of the connection structure of the bus unit 1 and the breaker unit 2 will be explained. The arrangement structure of holes of an outer flange is shown in FIG. 6. At the connection of the bus enclosure 7 of the bus unit 1, an outer flange 47 is formed. In the outer flange 47, a plurality of idle holes 48 and 49 are made in the peripheral direction and an O-ring groove 50 is provided outside the idle holes 48 and 49. An outer flange means a flange in which the idle holes 48 and 49 are located, is outside the outer diameter of the enclosure.

At the connection of the breaker enclosure 16 of the breaker unit 2, an inner flange 51 is formed. In the inner flange 51, a plurality of tapped holes 52 are made in the peripheral direction and an O-ring groove 50 is provided outside the tapped holes 52. An inner flange means a flange in which the tapped holes 52 are located is inside the outer diameter of the enclosure.

In the O-ring grooves 50 made in the outer flange 47 and the inner flange 51, O-rings for keeping an airtight seal between the units are mounted. On both sides of the insulating spacer 12 existing between the outer flange 47 and the inner flange 51, an O-ring groove 53 is made inside the idle holes 48 and 49 made in the outer flange 47 or the tapped holes 52 made in the inner flange 51.

Explaining more concretely, M20 idle holes 48 are provided in 45° -equal arrangement positions, 8 positions in total, on the periphery of the outer flange 47 including the horizontal and vertical directions and M16 idle holes 49 are provided in the other 8 positions. In the 4 horizontal and vertical positions of the insulating spacer 12, M20 tapped holes 54 are provided and M16 idle holes 55 are provided in the other 12 positions. M16 closed-end tapped holes 52 are provided in the 22.5° -equal arrangement positions, 16 positions in total, on the periphery of the inner flange 51 including the horizontal and vertical directions. In this embodiment, 4 or more holes with the same diameter are not continuously arranged in the peripheral direction and the bolt clamping force is evenly applied.

When a gas insulated switchgear is to be assembled, the insulating spacer 12 is provided between the outer flange 47 and the inner flange 51 and M16 closed-end bolts 56 are screwed into the tapped holes 52 made in 16 positions on the periphery of the inner flange 51 from the side of the outer flange 47. By this procedure, it is possible to provide the insulating spacer 12 between the outer flange 47 and the inner flange 51 and connect the bus unit 1 to the breaker unit 2.

Figure 4:
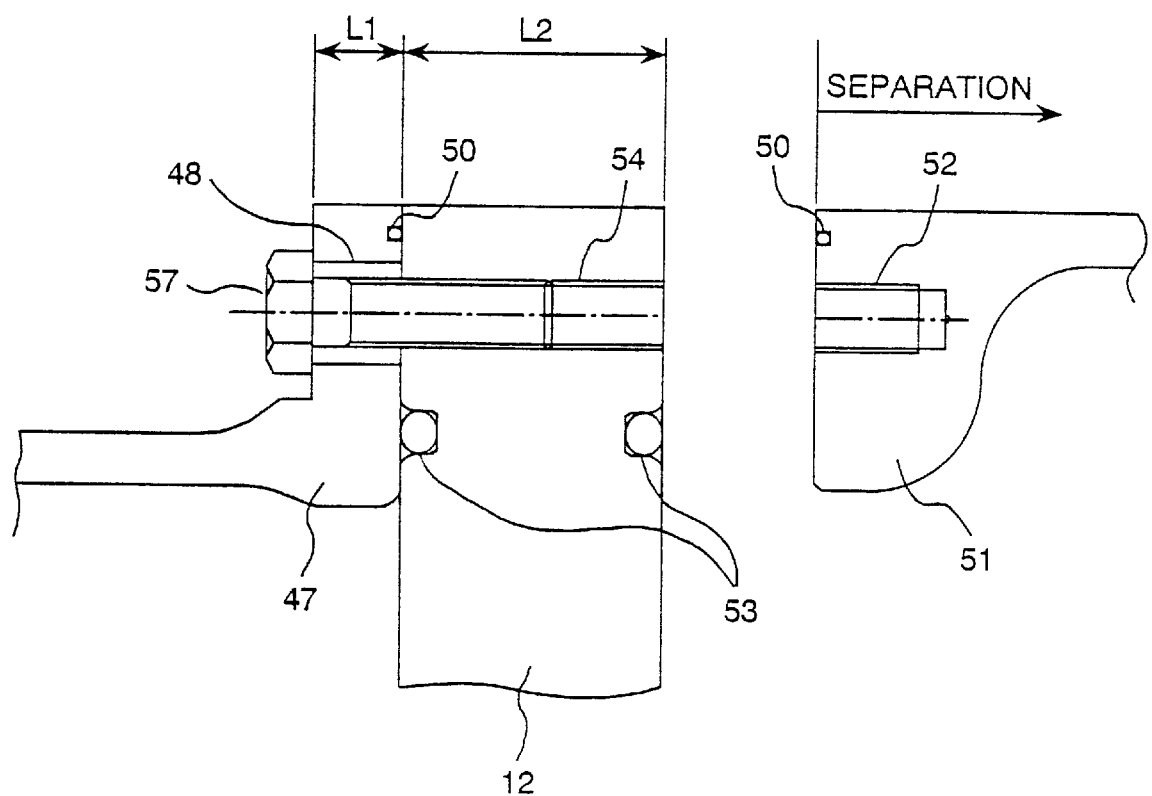
FIG. 4 is a cross sectional view for explaining separation of the inner flange side of an embodiment of the present invention.
Figure 5:
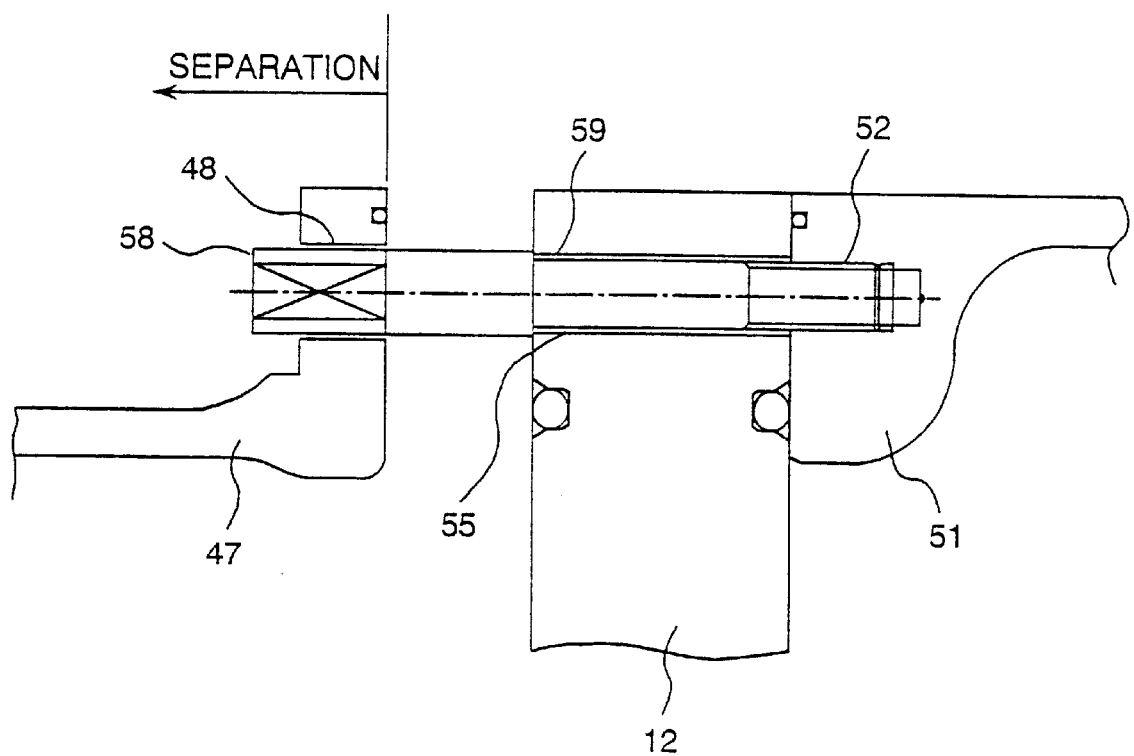
FIG. 5 is a cross sectional view for explaining separation of the outer flange side of an embodiment of the present invention.

The unit dismantling procedure at the time of maintenance and inspection or trouble recovery is shown in FIGS. 4 and 5. FIG. 4 shows a case that the units are dismantled in the state that the insulating spacer 12 is attached to the outer flange 47 of the bus enclosure 7 and FIG. 5 shows a case that the units are dismantled in the state that the insulating spacer 12 is attached to the inner flange 51 of the breaker enclosure 16. Before starting dismantling of the units, the insulating gas in the unit to which the insulating spacer 12 is not to be attached is collected and the pressure of insulating gas in the unit to which the insulating spacer 12 is to be attached is reduced.

When dismantling the units in the state that the insulating spacer 12 is attached to the outer flange 47 of the bus enclosure 7, the M16 closed-end bolts 56 clamped in the horizontal and vertical 4 positions are removed first. Next, assuming the thickness of the outer flange 47 as L1 and the thickness of the insulating spacer 12 as L2, M20 closed-end bolts 57 about L1+½×L2 in length are screwed into the portions where the M16 closed-end bolts 56 are removed from the side of the outer flange 47 and the insulating spacer 12 is attached to the outer flange 47.

In this case, depending on the position of the M20 closed-end bolts 57 for connecting the outer flange 47 to the insulating spacer 12, the position of M20 tapped holes 54 to be provided in the insulating spacer 12 and the position of idle holes 48 for M20 bolts to be provided in the outer flange 47 are decided. However, in this case, the horizontal and vertical positions are set as an example. Next, the M16 closed-end bolts 56 in the 12 positions other than the aforementioned 4 positions are removed. By this series of procedures, the bus unit 1 and the breaker unit 2 can be separated in the state that the insulating spacer 12 is attached to the outer flange 47.

When dismantling the units in the state that the insulating spacer 12 is attached to the inner flange 51 of the breaker enclosure 16, the M16 closed-end bolts 56 in the 4 positions at 45° from the horizontal and vertical directions are removed first. Next, a bolt 58 having a step 59 in which an M16 tapped part is formed at one end and a part of the column is machined flat at the other end is screwed into the portion where the M16 closed-end bolt 56 is removed from the side of the outer flange 47. In this case, the insulating spacer 12 is attached to the inner flange 51 by the step 59. Next, the M16 closed-end bolts 56 in the 12 positions other than the aforementioned 4 positions are removed. By this series of procedures, the bus unit 1 and the breaker unit 2 can be separated in the state that the insulating spacer 12 is attached to the inner flange 51.

What is claimed is:

1. In a gas insulated switchgear having first and second units attached together, and an insulating spacer positioned between said first and second units;

an inner flange formed on said first unit and an outer flange formed on said second unit;

wherein said first and second units are separable in a state that said insulating spacer is attached to either said inner flange of said first unit or said outer flange of said second unit.

2. In a gas insulated switchgear according to claim 1, when attaching said insulating spacer to said outer flange side, said outer flange and insulating spacer are attached by screwing a bolt into a tapped hole of said insulating spacer, and when attaching said insulating spacer to the inner flange side, said insulating spacer and said inner flange are attached by screwing a bolt into a tapped hole of said inner flange.

3. A gas insulated switchgear according to claim 1, wherein a plurality of first holes with a diameter of D1 are formed in the peripheral direction to said outer flange, and a plurality of second holes with a diameter of D2 are formed in the peripheral direction to said insulating spacer, and a plurality of third holes with a diameter of D3 are formed in the peripheral direction to said inner flange, and the relationship between said diameters of said holes is set to $D1 \geq D2 \geq D3$.

4. A gas insulated switchgear according to claim 3, wherein there are two sizes of diameters of said first holes and four or more holes with the same diameter are not continuously arranged.

5. A gas insulated switchgear according to claim 3, wherein some of said holes are tapped and the number of said tapped second holes is almost half the number of said first holes.

6. A gas insulated switchgear according to claim 3, wherein holes other than said tapped holes among said second holes are idle holes with a nominal diameter of said third holes, and the diameter of said first holes is approximately the same diameter as that of said idle holes, and said first holes are idle holes with the nominal diameter of said tapped holes among said second holes.

* * * * *